United States Patent [19]

Bornfriend

[11] 4,022,715

[45] May 10, 1977

[54] PROCESS FOR CATALYST MATERIALS OF INCREASED PORE VOLUME AND PORE DIAMETER

[75] Inventor: Robert Alan Bornfriend, Ridgefield, Conn.

[73] Assignee: American Cyanamid Company, Stamford, Conn.

[22] Filed: Dec. 31, 1975

[21] Appl. No.: 645,579

[52] U.S. Cl. .......................... 252/463; 252/477 R
[51] Int. Cl.$^2$ ......................................... B01J 21/04
[58] Field of Search ........... 252/463, 455 R, 477 R, 252/449; 106/87; 423/628, 631; 264/44, 59

[56] References Cited

UNITED STATES PATENTS

| | | | |
|---|---|---|---|
| 3,591,394 | 7/1971 | Diggelmann et al. | 106/87 |
| 3,608,060 | 9/1971 | Osment et al. | 423/628 X |
| 3,907,512 | 9/1975 | Ziegenhain et al. | 252/463 X |

Primary Examiner—W. J. Shine
Attorney, Agent, or Firm—William J. Van Loo

[57] ABSTRACT

Disclosed is a process for producing molded catalyst materials of increased pore volume and pore diameter which comprises incorporating a blowing agent in the composition from which they are molded.

9 Claims, No Drawings

PROCESS FOR CATALYST MATERIALS OF INCREASED PORE VOLUME AND PORE DIAMETER

This invention relates to a process for providing a catalyst support of increased porosity. More particularly, this invention relates to such a process wherein by incorporation in the composition from which the support is molded a compound which decomposes at elevated temperature to gaseous products and subsequent exposure to said elevated temperature, increased porosity results.

Inorganic oxide gels are widely used in the preparation of catalyst materials. A particularly desirable type of catalyst material is one in which the inorganic oxide gel is molded into a suitable support form, such as a small cylinder. Such supports may be active catalysts as prepared or may require promotion and/or activation by subsequent treatment.

A conventional process for preparing molded catalysts or catalyst supports consists of preparing a moldable composition of suitable inorganic oxide gel, molding the resultant composition into the desired structure, and thereafter setting the resultant structure by heat treatment. While this procedure provides desirable catalysts or catalyst supports for many purposes, the resultant catalyst materials are generally characterized by limited pore volume and by pores of limited diameter. As a result, these catalysts are limited in activity and are not suitably effective in reactions involving large molecules.

Numerous processes have been suggested in the past to provided molded catalyst of increased porosity and pore diameter. One such process involves incorporation of a volatile liquid in the molding composition, which liquid is volatilized after support molding. However, such process provides only limited increases in porosity and pore diameter. Another process incorporated within the molded structure synthetic or natural fibers which are subsequently burned off to provide voids. However, it is difficult to affect complete burn-off and catalyst poisons remain. Still another process involves leaching the heat-set support structure to dissolve out portions of the support composition. However, such procedure provides only limited increases in porosity before other desirable properties such as strength, attrition resistance, and the like are adversely affected. Still other processes have been suggested, but all suffer from one or more deficiencies.

These continues to exist, therefore, a need for a process for increasing the porosity and pore diameter of molded catalyst material while overcoming deficiencies of the prior art processes. Such a development would fill a long-felt need in the art and provide a notable advance in the art.

In accordance with the present invention, there is provided a process for producing a molded catalyst material of increased porosity which comprises: (1) preparing a moldable aqueous dispersion of an inorganic oxide gel; (2) uniformly incorporating in said dispersion an effective amount of a compound which undergoes decomposition with the liberation of gas at a decomposition temperature above the boiling point of water at atmospheric pressure; (3) molding the resultant composition to form a desired structure; and (4) thereafter heating said structure to a temperature above said decomposition so as to liberate said gas while setting the structure formed.

The present invention provides catalyst materials having increased porosity while maintaining desirable physical properties and avoiding other deficiencies of prior art procedures. The increased porosity is reflected in an increased proportion of pores of large diameter. This result is surprising in view of the fact that the decomposable compound liberates a gas.

Inorganic oxide gels useful in the process of the present invention include alumina, silica, titania, vanadia, molybdenia and the like as well as mixtures thereof. In addition coated gels or co-gels may be employed such as alumina-coated silica gels, silica-coated alumina gels and gel matrices into which are incorporated zeolites. Suitable gels may be used as hydrogels or xerogels. The various gels are prepared according to conventional methods.

The inorganic oxide gel is slurried in an aqueous medium to provide a moldable composition in accordance with conventional procedures. If desired, provision may be made for activator and/or promoter incorporation in the moldable composition or such provision may be deferred until the molded structure has been set and made by typical impregnation techniques. Provisions for extrusion aids will follow conventional procedures.

In accordance with the present invention, a compound which decomposes with the liberation of gas is incorporated in the moldable composition. In other applications, such decomposable compounds are known as "blowing agents" and any of the known blowing agents may be used provided that they decompose above the boiling point of water at atmospheric pressure. Particularly good results are obtained with sulfonyl hydrazides, i.e. compounds which feature the structure

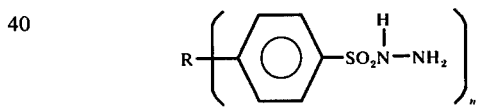

wherein $n$ is 1 or 2, R is lower alkyl ($C_1$-$C_4$) when $n$ is 1, and R is —O— when $n$ is 2. The preferred blowing agent is p,p'-oxybis(benzene sulfonyl hydrazide).

Incorporation of the blowing agent may be by any convenient means and should be uniformly dispersed. The blowing agent may be incorporated in the moldable composition as prepared, may be pre-dispersed in the aqueous medium, may be blended with the inorganic oxide gel, or may be incorporated in any manner that provides uniformity in the moldable composition.

The amount of blowing agent to be used is that which is effective in providing the desired increase in porosity. The actual amount will vary widely depending upon the extent to which porosity increases are desired, the nature of the inorganic oxide gel being processed, and the procedure of molding followed. Generally, an increase will be obtained with usage as low as 0.05 weight percent of blowing agent based on the dry weight of the gel being processed. Particularly good results are obtained at usage levels in the range of about 0.25 to 0.5%, same basis. The upper limit appears to be limited only by practical considerations.

After the moldable composition with its incorporated content of blowing agent is suitable for processing, it is molded to provide the desired structure. Molding is preferably carried out by extrusion in accordance with conventional procedures. Other methods such as pilling, pelletizing, and the like may be employed. The preferred structures are those of cylinders of ⅛ and 1/16 inch diameters. Polylobal cross-sectional shapes are also preferred for certain applications.

After the molded structure is obtained, it is exposed to heat treatment above the decomposition temperature of the decomposable compound so as to set the structure while the decomposition gases are being liberated. The particular nature of the heat treatment is not particularly critical so long as the temperature requirements are met. Generally the molded structure are subjected to a preliminary mild heat treatment and subsequently calcined, but the mild treatment may be eliminated. In the latter instance, the molded structure will gradually reach the calcination temperature and pass through the decomposition temperature of the blowing agent en route. The mild heat treatment and/or calcination are carried out in accordance with conventional procedures. When mild heat treatment is carried out it may be in the range of about 250° – 400° F. for from about 1 to 18 hours. Calcination temperatures are generally in the range of 800° – 1300° F. and the time of calcination is generally an hour or more. It is immaterial whether or not the decomposable compound decomposes under the optional mild heat treatment or when exposed to calcination.

A "catalyst material", as that term is used herein, refers to a support, which may be active in certain reactions, as well as promoted and/or activated supports. The molded structure, therefore, after calcination may be used directly as a catalyst if it is active or provision for promotion and/or activation were made in the moldable composition. In other cases, the molded structure is promoted and/or activated in accordance with conventional procedures.

The molded catalyst materials provided by the process of the present invention, as indicated, are characterized by increased porosity and a larger proportion of pores of large diameter than molded catalyst materials made from the same inorganic oxide gels according to conventional processes. It is known that increased porosity and pore diameter provide improved catalysts in numerous catalytic reactions. It is also known that catalysts having increased pore diameter have utility in reactions involving large molecules which are not effectively catalyzed by catalysts of smaller pore diameter. It is readily apparent, therefore, that molded catalyst materials provided by the process of the present invention has advantages in particular reactions over molded catalyst materials provided by conventional processes.

The invention is further illustrated in the examples which follow. In the following examples, reference is made to physical properties such as pore volume and the like. These tests are determined in accordance with the procedures described in the booklet "Test Methods For Synthetic Fluid Cracking Catalysts", published by American Cyanamid Company, January 1957, and widely distributed in the field. An additional test not given in this booklet is Crush Strength. This value is determined by placing a molded structure on its side between two parallel plates. Force is applied to the top plate by means of pneumatic pressure until the structure is crushed. The device is such that the air pressure in pounds to cause crushing is the Crush Strength of the structure.

EXAMPLE 1

25 Grams of p,p'-oxybis(benzene sulfonyl hydrazide) were dissolved in 250 ml. of acetone, and the solution was added to 15 lbs. of deionized water. This water emulsion was added to 14 lbs. of precipitated alumina powder in a Lancaster mix muller, along with 2.5 lbs. of aqueous ammonia (28% $NH_3$), and 52 gms of polyacrylamide extrusion aid. The mix was mulled for 25 minutes, after which two more pounds of precipitated alumina powder was added. After 15 more minutes, the mix was extruded through a 1/16 inch die plate. The mix pH was 9.8 and solids were 35%.

The raw extrudates were loaded onto trays and charged to an oven preheated to 350° F. After drying overnight, the extrudates were calcined for an hour at 1100° F. Properties of this sample are compared in the table below with those properties of a standard precipitated alumina extrudate made without the blowing agent included.

TABLE A

| Sample | Pore Volume cc/g | Porosity (cc/g) in Pore Sizes | | Compacted Bulk Density g/cc | Particle Diameter (inches) | Crush Strength (lbs.) |
| --- | --- | --- | --- | --- | --- | --- |
| | | 35Å – 150A dia. | 150Å – 1.77 μdia. | | | |
| Product from Example 1 | .88 | .592 | .225 | .54 | .059 | 12 |
| Control (without blowing agent) | .675 | .558 | .044 | .67 | .061 | 13 |

EXAMPLE 2

20 Gms of blowing agent were dissolved in about 200 ml. of acetone and the solution was added to 10 lbs. of deionized water. This water emulsion was added to 13 lbs. of a precipitated alumina powder in a muller, and mulled for 30 minutes. The mix was extruded through a 1/16 inch die plate. The mix solids were about 39%. The raw extrudates then were loaded on to trays and charged to an over preheated to 350° F. After drying overnight, the extrudates were calcined for an hour at 1100° F. Properties for extrudates made with two different blowing agents and a combination thereof are shown in the table below:

TABLE B

| Sample | Blowing Agent | Pore Volume (cc/g) |
| --- | --- | --- |
| 1 | p,p'-oxybis (benzene sulfonyl hydrazide) | .902 |
| 2 | toluene sulfonyl hydrazide | .765 |
| 3 | 50 – 50 mixture of | .698 |

TABLE B-continued

| Sample | Blowing Agent | Pore Volume (cc/g) |
|---|---|---|
| | agents 1 and 2 | |
| control | None | .573 |

We claim:

1. A process for producing a molded catalyst material of increased porosity which comprises: (1) preparing a moldable aqueous dispersion of an inorganic oxide gel; (2) uniformly incorporating in said dispersion an effective amount of a compound which undergoes decomposition with the liberation of gas at a decomposition temperature above the boiling point of water at atmospheric pressure; (3) molding the resultant composition to form a desired structure; and (4) thereafter heating said structure to a temperature above said decomposition temperature so as to liberate said gas while setting the structure formed.

2. The process of claim 1 wherein said heating is carried out in more than one step.

3. The process of claim 2 wherein one of said heating steps is a calcination step.

4. The process of claim 1 wherein said decomposable compound is p,p'-oxybis(benzene sulfonyl hydrazide).

5. The process of claim 1 wherein said decomposable compound is toluene sulfonyl hydrazide.

6. The process of claim 1 wherein said inorganic oxide gel is alumina.

7. The process of claim 1 wherein said molding is accomplished by extruding.

8. The process of claim 1 wherein the decomposable compound is incorporated as an emulsion in said aqueous medium.

9. The process of claim 2 wherein said structure if heated at 250°–400° F. in one step followed by calcination at 800°–1300° F.

* * * * *